United States Patent [19]

Zepp

[11] Patent Number: 4,832,378
[45] Date of Patent: May 23, 1989

[54] FLUID DUCT COUPLING AND SNAP CLIP THEREFOR

[75] Inventor: Lawrence P. Zepp, Ft. Wayne, Ind.

[73] Assignee: Dura Power Systems Division of Wickes Manufacturing Company, Plymouth, Mich.

[21] Appl. No.: 177,162

[22] Filed: Apr. 4, 1988

[51] Int. Cl.⁴ .............................................. F16L 37/08
[52] U.S. Cl. ...................................... 285/305; 285/321
[58] Field of Search ................. 285/321, 38, 305, 308, 285/320; 403/18; 411/521, 522, 516-519

[56] References Cited

U.S. PATENT DOCUMENTS

| 1,764,950 | 6/1930 | Griner . | |
|---|---|---|---|
| 2,025,848 | 12/1935 | Collis | 411/517 |
| 2,179,604 | 11/1939 | Tinnerman | 248/239 |
| 2,440,452 | 4/1948 | Smith | 285/174 |
| 2,441,344 | 5/1948 | Bosworth | 285/163 |
| 2,902,298 | 9/1959 | Kolthoff | 285/321 X |
| 2,925,802 | 2/1960 | White | 403/18 |
| 3,033,332 | 5/1962 | Geibel | 189/35 |
| 3,168,341 | 2/1965 | Beaudet | 287/119 |
| 3,391,954 | 7/1968 | Callahan | 287/52.05 |
| 3,401,436 | 9/1968 | Bradshaw | 24/256 |
| 3,450,424 | 6/1969 | Calisher | 285/305 |
| 3,471,186 | 10/1969 | Luebbert et al. | 285/305 X |
| 3,558,163 | 1/1971 | Moore et al. | 285/321 X |
| 3,603,619 | 9/1971 | Bengesser | 285/45 |
| 3,826,523 | 7/1974 | Eschbaugh | 285/39 |
| 4,123,091 | 10/1978 | Cosentino et al. | 285/39 |
| 4,428,604 | 1/1984 | Conner | 285/321 |
| 4,431,218 | 2/1984 | Paul, Jr. et al. | 285/305 |
| 4,526,411 | 7/1985 | Bartholomew | 285/305 |
| 4,601,497 | 7/1986 | Bartholomew | 285/319 |
| 4,619,089 | 10/1986 | Stein | 52/233 |
| 4,632,435 | 12/1986 | Polyak | 285/243 |
| 4,707,000 | 11/1987 | Torgardh | 285/305 |

FOREIGN PATENT DOCUMENTS 522349  7/1976  U.S.S.R. ................. 285/321

Primary Examiner—Dave W. Arola
Attorney, Agent, or Firm—Hugh A. Kirk

[57] ABSTRACT

The disclosure concerns a hollow socket and hollow plug therefor and a specific snap clip for locking the plug in the socket by normally bridging radially aligned cooperating grooves in said plug and socket. The plug and socket may include cooperating surfaces between which a gasket or O-ring may be seated for sealing the coupling. The clip primarily comprises a pair of cooperating semicircular diametrically oppositely movable semiannuli or ring sections connected at one of their adjacent parallel ends by an integral spring loop extending substantially axially from the plane of the semiannuli or ring sections. This loop is provided with a pair of parallel legs joined at one end to the adjacent parallel ends of said semiannuli and at their other ends to a more than semi-circular ring. This loop normally urges said semiannuli outwardly into the groove in the socket. The radial width of said semiannuli is about twice the radial depth of said groove in the socket and equal to or slightly less than the radial depth of the groove in the plug, whereby the pinching, such as by a pair of pliers, of the legs of the loop together adjacent said semiannuli enables the semi-annuli to be completely enclosed in the groove in the plug so that the plug may be axially removed from the socket. A segment opening in one side of the groove in the plug is provided for the legs of the loop and their extension beyond the end of the socket, thereby enabling access to said legs for pinching and unlocking the clip from the socket.

13 Claims, 4 Drawing Sheets

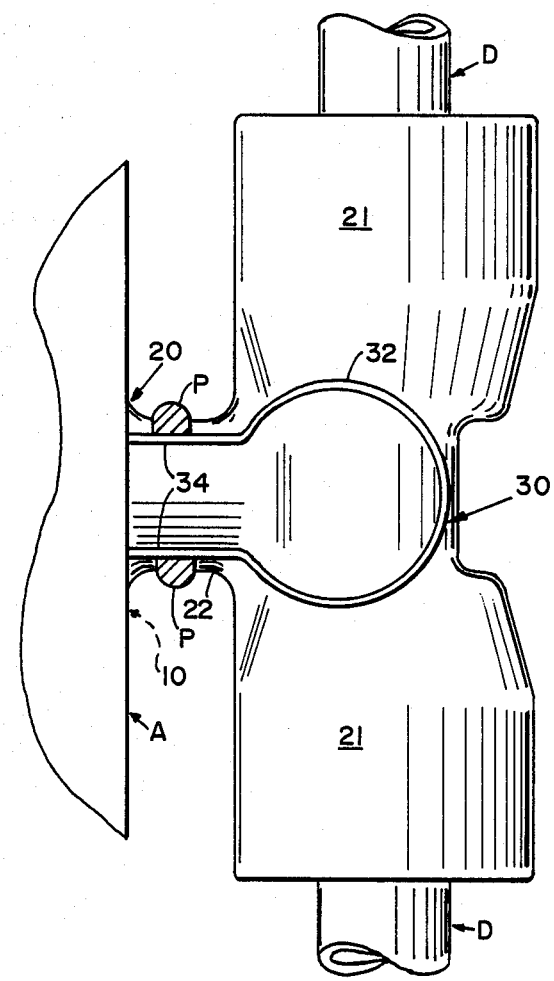

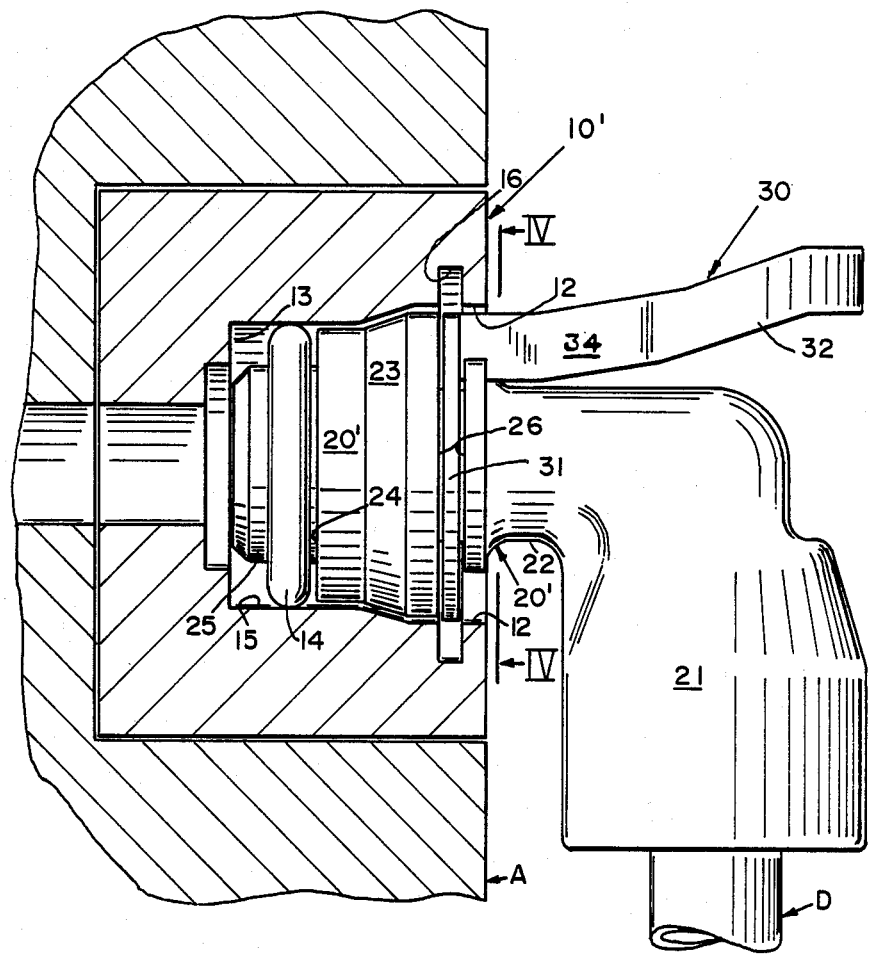

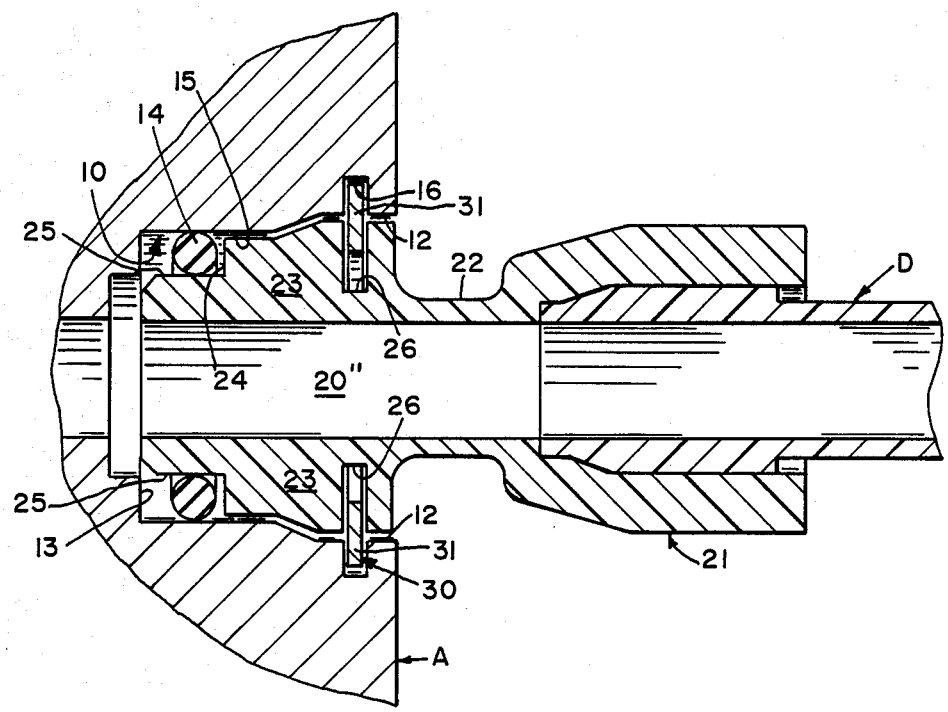
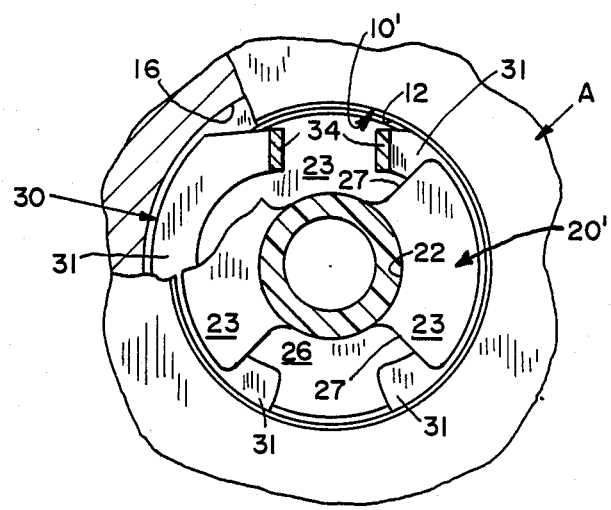

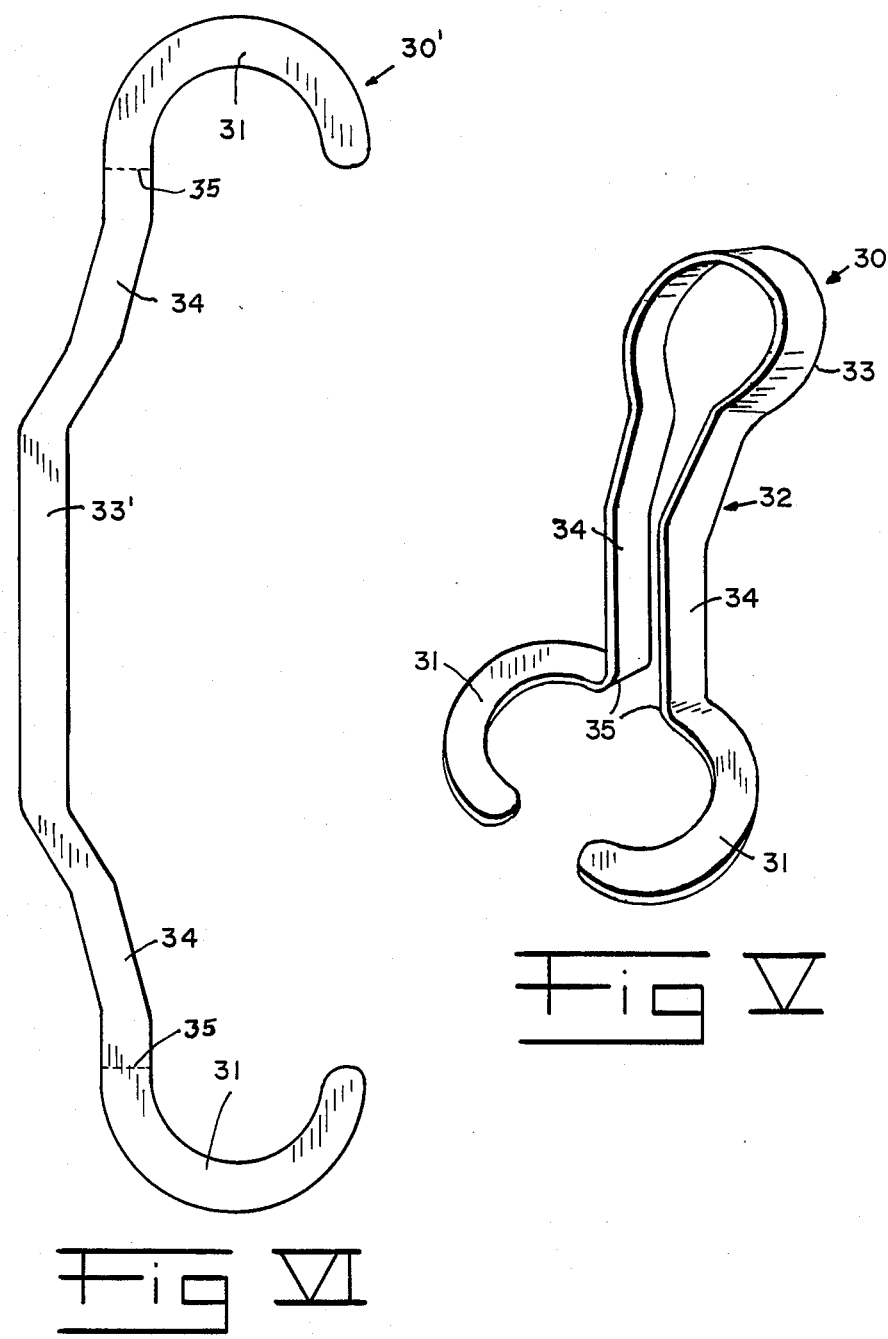

FLUID DUCT COUPLING AND SNAP CLIP THEREFOR

BACKGROUND OF THE INVENTION

Previously spring clips for locking the plug of a fluid duct into a socket comprised either a pair of parallel transverse holes for the ends of a hairpin-type clip or a split annulus fitting into radially aligned grooves in the plug and socket. The split ends of the annulus were intergrally connected to orthogonal parallel legs to be pinched together for reducing the circumference of the annulus into the groove in the plug to unlock the plug from the socket. Such a split ring annulus only bridged the two radially aligned grooves most effectively adjacent the legs, in that the sides of the annulus diametrically opposite the single split had substantially no radial movement whatsoever that could insure bridging between the cooperating radial grooves in the plug and socket. Furthermore, the integral connection between the legs and the resilient loop that may connect them and/or the split locking annulus, had this resilient movement in the radial width of the loop and annulus, which produces a much stiffer and harder to pinch clip than if the resiliency were in the thickness of loop strip.

SUMMARY OF THE INVENTION

Generally speaking the features of this invention comprise a hydraulic releaseable fitting comprising a mating socket, a plug, and a resilient snap clip for locking the plug in said socket. The socket is formed in a wall or in a member anchored into a piece of apparatus, such as a hydraulic pump or motor or the like. The socket has an inner surface for seating a gasket or O-ring. The plug is formed on a straight, "L", or "T" pipe fitting to which fitting a duct or ducts, such as plastic or metal tubing, is sealingly attached. The plug is hollow and preferably has an inner surface for engagement with the gasket for sealing the coupling. The socket and/or plug may be made of plastic, and each when connected have annual radially cooperating grooves, with the groove in the plug having a radial depth greater than that of the groove in the socket, preferably about twice the depth. The groove in the plug also is provided, on its side away from the end of the plug, with a cutout portion or segment extending axially of the plug.

These grooves and cutout portion hold the snap-on locking clip of this invention, with the grooves being bridged by a pair of cooperating semicircular rings or semiannuli of the clip, and the cutout portion being for the legs of the loop integrally connected to the parallel one adjacent ends of the semiannuli. These legs extend orthogonally to the plane of said annuli and substantially parallel to each other and to the axis of the annuli, plug and socket. The outer end or U-shaped base of the integral resilient loop of the snap clip is more than a semicircle in order to reduce the strain on the base of the U when the two legs are pinched together, such as by a pair of needlenose pliers. This pinching diametrically moves the two semiannuli inwardly and away from bridging the grooves in the plug and socket, to be completely within the groove in the plug, so the plug can be axially removed from the socket. Normally the resiliency of the loop maintains the semiannuli or ring sections diametrically away from each other for seating in the shallow groove of the socket and bridging the space between and into the groove in the plug, which groove in the plug is only about half filled with the semiannuli. This snap clip is usually composed of metal which has a spring action and is preferably non-corrosive, that is, being made of stainless steel or coated with a protective coating such as Teflon.

Objects and Advantages

It is an object of this invention to produce a simple, efficient, effective, econonmic, quickly operable, non-corrosive, positively locking and easy to operate fluid duct coupling and snap locking clip therefor.

Another object is to produce such a coupling which requires only a single gasket or O-ring for sealing and produces a stronger, more positive connection than previously known snap ring locked hydraulic couplings.

Still another object of this invention is to produce a specific resilient snap locking clip for a fluid duct coupling which is resilient, non-corrosive and moves diametrically to overlap a larger portion of the outer and inner radially aligned grooves of a socket and plug connection than previous snap rings that operate in such grooves.

A further object of this invention is to produce such a snap locking clip which has an integral U-shaped loop which is connected to the adjacent parallel one ends of semiannuli or ring sections that diametrically bridge the grooves, and is operably flexible orthogonal to the radial width of the annuli and loop dimensions.

BRIEF DESCRIPTION OF THE VIEWS

The above mentioned and other features, objects and advantages, and a manner of attaining them are described more specifically below by a reference to an embodiment of this invention shown in the accompanying drawings, wherein:

FIG. I is a side elevation of a preferred embodiment of this invention, wherein the plug is on a "T" duct fitting assembled in a socket of an apparatus and locked in the socket by a snap clip, the loop of which clip is shown projecting from the socket, and showing in section the jaws of a pair of pliers against the outside of the pair of parallel legs from the loop of the clip;

FIG. II is a side elevation of a plug with the clip at right angles to that shown in FIG. I, the plug being on an "L" duct fitting and assembled in a socket member shown in section, which member is anchored in the wall of an apparatus;

FIG. III is a sectional view of both the plug and socket of this invention as shown in FIG. I assembled with the plug being attached to a straight single duct connection;

FIG. IV is a radially sectional view taken along line IV—IV of FIG. II with a part of the plug and the socket broken away;

FIG. V is a perspective view of the locking clip per se according to one embodiment of this invention; and FIG. VI is a view of the cutout blank which forms the clip shown in FIG. V.

DETAILED DESCRIPTION OF A PREFERRED EMBODIMENT

Referring to the figures, there is shown an embodiment of a socket member 10 or 10' into which a plug member 20, 20' or 20" is releasably locked in position by a spring clip 30.

The Socket

Referring now primarily to FIGS. I through IV, there are shown several type duct fittings 20, 20' and 20" onto which the plug of the present invention may be connected. For example, FIG. I shows a "T" fitting 20, FIGS. II and IV an "L" fitting 20', and FIG. III a straight fitting 20". On each of these fittings there is provided one or more similar enlarged hollow cylindrical portions 21 with sockets for fastening and hermetically sealing or fusing a duct or ducts D thereto.

The socket 10 in FIGS. I and III shows a wall of an apparatus A, such as a hydraulic motor, pump, tool, or the like, while in FIGS. II and IV the socket 10' is formed in a separate member which is anchored in the wall A of an apparatus. Since the plug 20, 20' or 20" of this invention requires a specifically formed cooperating socket, it may be more economical to form the socket 10' in a separate member which may then in turn be fastened or anchored into a standard-type hole or seat in the wall of an apparatus, such as by brazing, soldering, adhering, or by threads (not shown), rather than having to form the special socket 10 or 10' in the wall A of each apparatus.

The specific socket 10 or 10' herein shown in FIGS. II, III and IV, comprises an enlarged opening 12 which may be provided with a bottom or inner shoulder 13 and a reduced diameter cylindrical intermediate surface 15 against which a gasket or O-ring 14 may be placed for sealing the coupling with the inner end of the plug 20, 20' or 20".

An important part of this socket portion 12 is the outwardly extending groove 16 into which the semiannuli 31 of the snap clip 30 normally engage and extend radially inwardly therefrom as shown in FIGS. III and IV. The annular groove 16 in the socket 10 or 10' is preferably near the outer open end of the socket 10 or 10', but spaced inwardly sufficiently to provide a strong enough shoulder to strongly lock and anchor the plug 20, 20' or 20" in the socket 10 or 10'. The socket portion 12 may be cylindrical and/or slightly frusto-conical to a reduced diameter cylindrical gasket-engaging surface 15 and to bottom or inner shoulder 13.

The Plug

Referring again to FIGS. I through IV, and more specifically FIGS. II, III and IV, there is shown a plug 20' or 20" which has a narrower neck portion 22 which extends to the outer or plug portion 23, that inserts completely within the socket portion 12 of the socket 10 or 10'. This plug portion 23 is also provided with a shoulder 24 and cylindrical gasket-engaging surface 25 which also engages the gasket or O-ring 14 for providing a seal between the plug 20 and socket member 10 or 10'.

An important feature of this plug portion 23 is a deep inwardly extending radial annular groove portion 26, which groove is preferably at least twice as deep radially as the groove 16, and also has at least one cut-away portion 27 (see FIG. IV) to the one side of the groove 26 between the groove and neck section 22. This cutout section or segment 27 may be as much as about 90° of arc, and may also have a diametrically opposite similar cutout section. One of these cutout sections provides a space for the legs 34 of the loop 32 of the clip 30 (see FIGS. IV and V). The groove 26 is of sufficient radial depth that when the semiannuli or ring sections 31 of the clip 30 are squeezed diametrically towards each other or inwardly, all of the semiannuli will be within the grooves 26 so that the plug portion 23 of plug 20, 20' or 20" can easily be pulled axially out of the socket portion 12 of the socket 10 or socket member 10'. This groove 26 also, as in groove 16, is near the inner end of the plug portion 23 but spaced sufficiently from the neck portion 22 to provide a strong enough shoulder to strongly lock and anchor the plug 20, 20' or 20" in the socket 10 or 10'.

The Snap Clip

Referring now to all six of the figures, the resilient metal snap clip 30 is most clearly shown in FIG. V. This clip 30 comprises a pair of semiannuli 31 which are integrally interconnected by a loop or U-shaped member 32 having more than a semicircular or substantially circular base or outer end portion 33 and parallel legs 34 which are connected directly to parallel adjacent ends of the semiannuli 31. The legs 32 of the loop 33 may extend slightly radially outwardly from their connection 35 to the semiannuli 31 so as to be more easily gripped by neeldenose plier jaws P (see FIG. II) and not interfere with the enlarged portions 21 of the duct fittings. As clearly shown in FIGS. III and IV, the semiannular rings 31 of the clip 30 normally engage completely in the socket groove 16 and correspondingly a substantially equal amount of area in the outer portion of the socket 26 of the plug 20, thus giving a positive and larger bridging area between the two grooves 16 and 26 than normally provided by only a simple radially split annulus or ring. As shown in FIG. I, a pair of jaws P of a needlenose pliers may be applied to the opposite outer parallel faces of the legs 34 adjacent the socket 10 to squeeze the two semiannuli 31 together to be completely within the groove 26 (and inner parallel surfaces of the legs 34 will substantially contact each other) so that the plug 20 can be axially removed from the socket 10 and 10'.

There is shown in FIG. VI a blank 30' for forming the clip 30 shown in FIG. V, which blank has the two semicircular annuli locking portions 31 at its ends, leg portions 34 and the outer end portion 33' joining the legs 34. This illustrates that the clip can be easily formed from a single piece of metal 30' and bent into the shape shown in FIG. V at right angles at line 35' and into a substantial circle at portion 33'. Then it is tempered to its proper resilience. Since it is formed by being bent out of a flat strip or blank 30' as shown in FIG. VI, all of its easy resilience is in the substantially circular loop portion 33 which is orthogonal to the wider portion of the strip or blank 30' and not in the same plane thereof.

The Conclusion

Although the embodiment described in this invention usually has the socket made of metal, and the plug made of plastic, the plug and socket can be also made of other material, including metals, and have other outside configurations without departing from the scope of this invention. Also, although the clip 30 is shown made of metal, it may either be made of stainless steel, springy steel, brass, bronze, aluminum, beryllium copper, and/or may be coated with a non-corrosive material to prevent corrosion and/or deterioration, or made of certain plastic materials. Furthermore, the plug may be either connected to metal or plastic ducts including a flexible hose.

While there is described above the principles of the invention in connection with specific apparatus, it is to be clearly understood that this description is made only by way of example and not as a limitation to the scope of this invention.

I claim:

1. A snap clip for a plug and socket connection wherein said socket has an annular groove and said plug has an annular groove about twice as deep radially as the radial depth of the annular groove aligned therewith in said socket, said groove in said plug being of substantially the same axial width as said groove in said socket, said clip comprising:
   (A) a pair of oppositely diametrically movable substantially semicircular ring sections having adjacent parallel ends, said semicircular sections completely circumferentially engageable in said groove of said socket and normally briding and engaging both said grooves for anchoring said plug in said socket, and
   (b) a more-than-semicircular loop with parallel legs extending orthogonally to the plane of said ring sections and integrally connecting the adjacent parallel ends of said semicircular ring sections, whereby pinching said legs moves said semicircular ring sections completely into said groove of said plug so that said plug can be axially removed from said socket.

2. A snap clip for a plug and socket according to claim 1 wherein said more-than-semicircular loop is a substantial circle split to be connected to said legs.

3. A snap clip for a plug and socket according to claim 1 wherein said plug is hollow and said socket has an inner outlet.

4. A snap clip for a plug and socket according to claim 3 wherein said plug and socket are provided with spaced cooperating surfaces, and a gasket is seated between said surfaces for hermetically sealing said plug in said socket.

5. A snap clip for a plug and socket according to claim 1 wherein said socket is in the wall of an apparatus.

6. A snap clip for a plug and socket according to claim 5 wherein said socket is in a separate member which is anchored to said wall.

7. A fluid duct coupling comprising:
   (A) a socket having an inner shoulder and outwardly spaced therefrom a first annular groove,
   (B) a plug having an outer shoulder and spaced therefrom a second annular groove radially aligned with and radially deeper than said first annular groove, said second annular groove being of substantially the same axial width as said first annular groove,
   (C) a sealing gasket between said shoulders, and
   (D) a spring U-shaped clip having a pair of cooperating semicircular jaws radially wider than said first groove is deep but not radially wider than the depth of said second groove, said jaws being circumferentially engaged in said grooves, and said jaws having adjacent parallel ends and being integrally connected by a loop extending orthogonally from the plane of said jaws at the adjacent parallel ends of said semicircular jaws.

8. A fluid duct coupling according to claim 7 wherein said socket is in the wall of an apparatus.

9. A fluid duct coupling according to claim 6 wherein said socket is in a separate member which is anchored to said wall.

10. A hose coupling comprising:
   (1) a hollow plug having an annular outer groove of a given width and a given depth and having an open sector on one side thereof of less than about 90°,
   (2) a socket for said plug having an annular inner groove having a width substantially the same as the width of said outer groove and having a depth less than the depth of said groove in said plug, and alignable raidally with said outer groove, and
   (3) a resilient snap clip for anchoring said plug in said socket comprising:
      (a) a pair of substantially semicircular annuli having adjacent parallel ends, said semicircular annuli completely circumferentially fittable in said outer groove of said plug and normally bridging both of said grooves, and
      (b) an integral connection having a loop and pair of parallel legs extending orthogonally between the adjacent parallel ends of said semicircular annuli, said loop being more than a semicircle, whereby pinching of the legs moves said annuli diametrically toward each other and into said outer groove of said plug, enabling axial removal of said plug from said socket.

11. A hose coupling according to claim 10 wherein said plug has an outer surface and shoulder, and wherein said socket has an inner surface and shoulder adjacent said plug's outer surface and shoulder, and including a gasket between said surfaces and shoulders for sealing said coupling.

12. A hose coupling according to claim 10 wherein said socket is in the wall of an apparatus.

13. A hose coupling according to claim 12 wherein said socket is in a separate member which is anchored to said wall.

* * * * *